United States Patent
Coon et al.

[15] 3,700,723
[45] Oct. 24, 1972

[54] 2,2-BIS (DIFLUORAMINO)-5-FLUORO-5,5 DINITRO-1-PENTYL ACRYLATE

[72] Inventors: Clifford L. Coon, Fremont; Marion E. Hill, Palo Alto; Donald L. Ross, Menlo Park, all of Calif.

[73] Assignee: The United States of America as represented by the Secretary of the Navy

[22] Filed: Oct. 10, 1969

[21] Appl. No.: 866,436

[52] U.S. Cl. ............... 260/486 H, 149/88, 260/584 R
[51] Int. Cl. ................................................. C07c 69/52
[58] Field of Search ............... 260/486 H, 584, 486 R

[56] References Cited

UNITED STATES PATENTS

| | | | |
|---|---|---|---|
| 3,436,419 | 4/1969 | Rhodes | 260/584 X |
| 3,441,550 | 4/1969 | Zimmerman | 260/584 X |

*Primary Examiner*—Leland A. Sebastian
*Attorney*—Richard S. Sciascia, Q. Baxter Warner and Gayward N. Mann

[57] ABSTRACT

The propellant additive 2,2-bis (difluoramino)-5-fluoro-5,5 dinitro-1-pentyl acrylate is synthesized by reacting acryloyl chloride with 2,2-bis (difluoramino)-5-fluoro-5,5-dinitro-1-pentanol.

3 Claims, No Drawings

2,2-BIS (DIFLUORAMINO)-5-FLUORO-5,5 DINITRO-1-PENTYL ACRYLATE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

This invention relates to binder compounds for propellants and more particularly to binder compounds containing the difluoramino group and a method for the preparation of the same.

2. Description of the Prior Art

It is well known that various ingredients may be incorporated into propellants or other energetic compositions in order to improve their stability, specific impulse, burning rate, etc. However many prior additives have not been too successful or have resulted in undesirable side effects. The composition of this invention may, however, be successfully incorporated into energetic compounds to achieve high specific impulses and fast burning any without and such undesirable side effects.

SUMMARY OF THE INVENTION

The present concept involves a novel binder composition which when incorporated into propellants or other energetic materials will provide improved specific impulses and increased burning rates. Specifically the present binder composition is the highly fluorinated compound 2,2-bis (difluoramino)-5-fluoro-5,5 dinitro-1-pentyl acrylate which is synthesized by reacting 2,2-bis (difluoramino)-5-fluoro-5,5-dinitro-1-pentanol with acryloyl chloride in the presence of titanium tetrachloride.

OBJECTS OF THE INVENTION

It is an object of the present invention to provide an improved binder composition suitable for incorporation into energetic materials.

It is another object of this invention to provide an improved binder composition which achieves high specific impulses and fast burning rates when incorporated into energetic materials.

It is a further object to provide an improved binder composition for energetic materials which is economical to synthesize and efficient in operation.

Other objects, advantages, and novel features of the invention will become apparent from the following detailed description.

DESCRIPTION OF THE PREFERRED EMBODIMENT

This invention involves a novel acrylate propellant binder 2,2-bis (difluoramino)-5-fluoro-5,5-dinitro-1-pentyl acrylate which was synthesized by reacting 2,2-bis (difluoramino)-5-fluoro-5,5 dinitro-1-pentanol with acryloyl chloride in the presence of titanium tetrachloride in accordance with the equation:

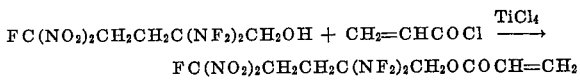

It is to be noted that the reactant 2,2-bis (difluoramino)-5-fluoro-5,5dinitro-1-pentanol is similarly a novel compound and copending patent application Ser. No. 866,437 filed Oct. 10, 1969 covering its concept and synthesis has also been filed in the U. S. Pat. Office.

The following example serves to illustrate the invention. However it is not limited thereto.

EXAMPLE

To a solution of 1.06 g. of 2,2-bis (difluoramino)-5-fluoro-5,5-dinitro-1-pentanol in 20 ml. of acryloyl chloride was added one drop of titanium tetrachloride. The resulting solution was stirred at ambient temperature for 3 hours; during such time a vacuum of 300 mm was applied to remove hydrogen chloride which evolved. After excess acryloyl chloride was removed under vacuum, the resulting product was taken up in 10 ml. of methylene chloride ($CH_2CL_2$) and treated successively with 25 ml. portions of 2N hydrochloric acid, water and 5 percent sodium bicarbonate solution. The solution was dried with magnesium sulfate and the solvent was removed leaving 1.22 g of colorless liquid 2,2-bis (difluoramino)-5-fluoro-5,5-dinitro-1-pentyl acrylate. Approximately a 93 percent yield was obtained.

While the thus prepared navel acrylate is primarily useful as a binder to propellants and other energetic compounds, it may also be used as a monomer for polymerization purposes.

As a binder ingredient, the present novel acrylate may provide a propellant with highly improved energy and stability characteristics. It is believed that this is probably due respectively to the relatively high number of oxidizer groups and the geminate difluoramino group.

We claim:

1. The compound 2,2-bis (difluoramino)-5-fluoro-5,5-dinitro-1-pentyl acrylate having the formula:

$$FC(NO_2)_2CH_2CH_2C(NF_2)_2CH_2OCOCH=CH_2$$

2. The method of synthesizing 2,2-bis (difluoramino)-5-fluoro-5,5-dinitro-1pentyl acrylate comprising:

reacting 2,2-bis (difluoramino)-5-fluoro-5,5-dinitro-1-pentanol with acryloyl chloride in the presence of titanium tetrachloride.

3. The method of claim 2 wherein the preferred amount of 2,2-bis (difluoramino)-5-fluoro-5,5-dinitro-1-pentanol is 1.06 grams while the preferred amount of acryloyl chloride is 20 milliliters.

* * * * *